United States Patent [19]

Coleman

[11] 4,168,259

[45] Sep. 18, 1979

[54] GLASS REINFORCED PBT RESINS

[75] Inventor: Ernest A. Coleman, Kinnelon, N.J.

[73] Assignee: GAF Corporation, New York, N.Y.

[21] Appl. No.: 814,547

[22] Filed: Jul. 11, 1977

[51] Int. Cl.$^2$ .......................... C08K 7/14; C08K 7/20
[52] U.S. Cl. .................................. 260/40 R; 525/176
[58] Field of Search .............................. 260/40 R, 873

[56] References Cited

U.S. PATENT DOCUMENTS

| 4,013,613 | 3/1977 | Abolins et al. | 260/40 R |
| 4,022,748 | 5/1977 | Schlichting et al. | 260/40 R |
| 4,035,333 | 7/1977 | Kamoda et al. | 260/40 R |

Primary Examiner—Sandra M. Person
Attorney, Agent, or Firm—Walter C. Kehm; Joshua J. Ward

[57] ABSTRACT

Molding composition and molded products comprising polybutylene terephthalate containing thermally stable reinforcing fibers, such as glass fibers, having an aspect ratio of at least about 5 and inert filler, such as glass spheres, having an aspect ratio less than about 3. In a preferred embodiment, the composition also includes amorphous, thermally stable resins such as polymethyl methacrylate.

13 Claims, No Drawings

GLASS REINFORCED PBT RESINS

BACKGROUND OF THE INVENTION

Polybutylene terephthalate (PBT) reinforced with thermally stable reinforcing fibers such as glass fibers is well known as a molding resin and is described in numerous patents and publications including for instance U.S. Pat. No. 3,814,725. Fiber reinforcement generally improves the tensile strength, flexural strength, flexural modulus and heat deflection temperature of the molding composition. However, moldings, especially injection moldings of large fiber-reinforced articles of PBT, tend to display distortion or warping while some other resins of otherwise less desirable properties do not present such problems. It is believed that such warping is due to the presence of the very reinforcing fibers which contribute to the enhanced physical characteristics of the finished product.

SUMMARY OF THE INVENTION

It is, accordingly, an object of the present invention to provide an improved PBT molding composition and method for producing same as well as molded articles of such composition. As compared with known prior art compositions, the molded articles of the invention have substantially less distorton due to warping and retain substantially all of the improved physical properties imparted by reinforcing fibers.

Molding composition of the invention comprises at least about 25 wt percent (wt%) PBT having an intrinsic viscosity (I.V.) between about 0.5 and about 1.5 deciliters per gram (dl/g) and contains:

(a) between about 10 and about 100 wt% based on PBT of thermally stable reinforcing fibers of a diameter between about 5 and about 20 microns and an aspect ratio of at least about 5: and (b) between about 1 and about 40 wt% based on PBT of inert filler particles having diameters between about 0.2 and about 50 microns and aspect ratios of less than about 3.

In a preferred embodiment, the molding resin of the invention also contains between about 10 and about 100 wt% based on PBT of an amorphous, thermally stable resin such as polymethyl methacrylate. Further preferred embodiments involve the use of glass fibers as the reinforcing fibers and glass spheres as the inert filler. The invention also contemplates a method for producing molding resin of the invention by intimately blending the above-mentioned ingredients of such resin and molded products made from molding composition of the invention.

DETAILED DESCRIPTION OF THE INVENTION

As mentioned above, the invention includes a novel molding composition, molded articles of such composition and method for producing such composition. The molding composition broadly comprises between about 25 and about 80 weight percent (wt%) PBT having an I.V. between about 0.5 and about 1.5 dl/g and containing between about 10 and about 100 wt% based on PBT of thermally stable reinforcing fibers having a diameter between about 5 and about 20 microns and an aspect ratio of at least about 5 together with between about 1 and about 40 wt% based on PBT of inert particulate filler having a diameter between about 0.2 and about 50 microns and an aspect ratio less than about 3. In a preferred embodiment, the composition also contains between about 10 and about 100 wt% based on PBT of an amorphous, thermally stable resin.

Polybutylene terephthalate (PBT) used in the invention may be produced in any suitable manner such as by reacting terephthalic acid or a dialkyl ester of terephthalic acid, e.g. dimethyl terephthalate, with diols having four carbon atoms, e.g. tetramethylene glycol. PBT for use in the invention has an intrinsic viscosity (I.V.) between about 0.5 and about 1.5 dl/g measured in orthochlorophenol at 25° C. with material having an I.V. between 0.5 and about 1.1 dl/g being preferred. Manufacture of PBT is well known to those skilled in the art as are the techniques for obtaining PBT of desired intrinsic viscosity. Such conventional production techniques for PBT are discussed in greater detail for instance in U.S. Pat. No. 2,465,319.

Thermally stable reinforcing fibers used in the invention may be any such fibers which are thermally stable at the conditions normally used in the production of products from PBT molding compositions and include, for instance, fibers of materials such as glass, asbestos, carbon,, fibrous potassium titanate, iron whiskers, etc. Such fibers should normally have diameters between about 5 and about 20 microns and aspect ratios (ratio of length of fiber to diameter of fiber) of at least about 5. Glass fibers are strongly preferred for use in the invention. Glass fibers, where used, preferably have diameters between about 10 and about 15 microns and aspect ratios of at least about 20.

Reinforcing fibers used in the invention are normally used in amounts between about 10 and about 100 wt% based on PBT, more preferably in amounts between about 20 and about 50 wt% on the same basis. As is commonly recognized, the use of such fibers increases substantially such physical properties as tensile strength, flexural strength, flexural modulus and deflection temperature of the PBT. Glass or other fibers for use in the invention may be manufactured and incorporated into the PBT in any suitable manner such as by separate blending with the PBT, blending with other ingredients of the compositions of the invention or incorporating into the PBT or PBT containing composition during injection molding of products from the PBT.

As mentioned above, fiber reinforced PBT, while imparting substantially improved physical properties to products made therefrom, unfortunately suffers from excessive warpage believed to be due to the presence of the fibers. It is thus necessary in accordance with the present invention to incorporate in the compositions and products of the invention additional inert filler of substantially lower aspect ratio than the fibers. More specifically, filler particles without substantial shape factor, i.e., having an aspect ratio less than about 3 are required. Suitable materials include for instance, glass, clay, silica, silicates, alumina, borates, oxides, etc. Filler material of low aspect ratio is, in accordance with the invention, incorporated in the molding compositions and products of the invention in amounts between about 1 and about 40 wt% based on PBT and serves to control shrinkage of molded PBT products in general as well as alleviating the warpage problem normally experienced with fiber reinforced PBT. Low aspect ratio filler having particle diameters between about 0.5 and about 30 microns is preferred with the use of solid glass spheres being especially preferred.

In addition to the above-mentioned essential ingredients, the use of an additional ingredient, i.e. an amorphous, thermally stable resin, in amounts between about 2 and about 50 wt% based on PBT is very strongly preferred. Suitable resins for this purpose include generally any amorphous resin which is thermally stable under the conditions used in forming molded products from PBT and may include such diverse materials as polymethyl methacrylate, poly (butyl methacrylate-co-methylmethacrylate), poly (ethylacrylate-co-methylmethacrylate), (poly (vinyl butyral) etc. An especially preferred amorphous resin for use in the invention is polymethyl methacrylate, generally available under the tradename Lucite ® or Plexiglas ®.

Amorphous resins of the type discussed above are known for use as additives to improve appearance of molded products; however, such resins have not previously been known to have an influence on warpage of molded products. It has now been found that the addition of such amorphous, thermally stable resin, especially the preferred polymethyl methacrylate resin, to the compositions and products of the invention results in an improvement with respect to warpage characteristics of molded products beyond anything obtainable without the addition of such amorphous resin. Amorphous resin used in the invention, especially the preferred polymethyl methacrylate, is preferably resin having a number average molecular weight between about 5,000 and about 500,000.

Compositions and products of the invention, while based on PBT may contain up to about 20 wt% based on PBT of suitable flame retardant additives and may contain relatively minor amounts of other materials which do not unduly effect the desired characteristics of finished products. Such additional materials may, depending upon the particular compositions employed and products desired, include for instance colorants or lubricants. Where present, such additional materials (other than flame retardants) normally comprise not more than about 5 wt% of the total molding composition or finished product.

In preparing molding compositions of the invention, the reinforcing fibers may be intimately blended into the PBT by any suitable means such as by dry blending or melt blending, blending in extruders, heated rolls or other types of mixers. Conventional master batching techniques may also be used. The same general considerations apply to addition of the other essential or optional ingredients of the composition of the invention, including specifically the inert filler of low aspect ratio and the amorphous, thermally stable resin. Suitable blending techniques are well known in the art and need not be described in detail herein.

The following example is intended to illustrate the invention without limiting the scope thereof. In the example, all quantities are given in terms of weight percent based on total composition unless otherwise stated. Notched Izod impact strength is reported in accordance with ASTM D-256. Warp is reported as "yes" or "no" depending upon whether the test specimen showed visual evidence of warping.

EXAMPLE

Compositions having the ingredients shown in Table I below were prepared using PBT having an intrinsic viscosity of 0.8. The compositions were compounded on a Midland Ross 1.5 inch extruder using the following conditions:

Temperature—240°-255° C.
Pressure—0-200 psi
Amperage—10-12
Screw RPM—75

TABLE I
PBT MOLDING COMPOSITIONS

| Ingredient | (Amount wt %) Composition No. | | | |
|---|---|---|---|---|
| | 1 | 2 | 3 | 4 |
| PBT (0.8 I.V.) | 70 | 70 | 70 | 55 |
| Solid Glass Fibers (3/16") | 30 | 7 | 9 | 27 |
| Glass Spheres-Potter Bros. 3000 | — | 23 | 17 | 5 |
| Polymethylmethacrylate Lucite 147F | — | — | 4 | 13 |

The pelletized, filled extrudate was then molded on a reciprocating screw injection molding machine to provide test specimens. Impact strength and warp of these specimens is reported in Table II below.

TABLE II
PROPERTIES OF MOLDED SPECIMENS

| Composition No. | Notched Izod Impact ft. lb/in. | Visual Warp |
|---|---|---|
| 1 | 1.5 | Yes |
| 2 | 0.7 | No |
| 3 | 0.7 | No |
| 4 | 1.2 | No |

What is claimed is:

1. Molding composition comprising at least about 25 wt% PBT having an intrinsic viscosity between about 0.5 and about 1.5 dl/g and containing:
    (a) between about 10 and about 100 wt% based on PBT of thermally stable glass reinforcing fibers having diameters between about 5 and about 20 microns and aspect ratios of at least about 5; and
    (b) between about 1 and about 40 wt% based on PBT of solid glass spheres having diameters between about 0.2 and 50 microns.

2. Molding composition according to claim 1 which also contains between about 10 and about 100 wt% based on PBT of an amorphous, thermally stable resin.

3. Molding composition according to claim 1 in which the fibers have diameters between about 10 and about 15 microns and aspect ratios less than about 20.

4. Molding composition according to claim 2 wherein the amorphous, thermally stable resin is polymethyl methacrylate having a number average molecular weight between about 5,000 and about 500,000.

5. A molded article of the molding composition of claim 1.

6. A molded article of the molding composition of claim 2.

7. A molded article of the molding composition of claim 3.

8. A molded article of the molding composition of claim 4.

9. A method for producing an improved molding composition comprising intimately blending PBT having an intrinsic viscosity between about 0.5 and about 1.5 deciliters per gram with:
    (a) between about 10 and about 100 wt% based on PBT of thermally stable glass reinforcing fibers having diameters between about 5 and about 20 microns and aspect ratios of at least about 5; and (b) between about 1 and about 40 wt% based on PBT of solid glass spheres having diameters between about 0.2 and about 50 microns.

10. Method according to claim 9 wherein between about 10 and about 100 wt% based on PBT of an amorphous, thermally stable resin is also intimately blended into the composition.

11. Method according to claim 9 wherein the fibers have diameters between about 10 and about 15 microns and aspect ratios greater than about 20.

12. Method according to claim 10 wherein the amorphous, thermally stable resin is polymethyl methacrylate.

13. Method according to claim 10 wherein the amorphous, thermally stable resin is polymethyl methacrylate having a number average molecular weight between about 5,000 and about 500,000.

* * * * *